United States Patent
Morigaki et al.

(10) Patent No.: US 6,821,675 B1
(45) Date of Patent: *Nov. 23, 2004

(54) NON-AQUEOUS ELECTROLYTE SECONDARY BATTERY COMPRISING COMPOSITE PARTICLES

(75) Inventors: Kenichi Morigaki, Hyogo (JP); Kazuya Iwamoto, Osaka (JP); Hizuru Koshina, Osaka (JP); Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/601,234
(22) PCT Filed: Nov. 30, 1999
(86) PCT No.: PCT/JP99/06686
§ 371 (c)(1), (2), (4) Date: Oct. 30, 2000
(87) PCT Pub. No.: WO00/33400
PCT Pub. Date: Jun. 8, 2000

Related U.S. Application Data

(63) Continuation-in-part of application No. 09/090,484, filed on Jun. 3, 1998, now Pat. No. 6,090,505.

(30) Foreign Application Priority Data

| Dec. 2, 1998 | (JP) | 10-342885 |
| Dec. 2, 1998 | (JP) | 10-342886 |
| Dec. 2, 1998 | (JP) | 10-342893 |
| Dec. 2, 1998 | (JP) | 10-342894 |

(51) Int. Cl.$^7$ ................................ H01M 4/58
(52) U.S. Cl. ............ 429/218.1; 429/229; 429/231.95
(58) Field of Search ............... 429/218.1, 229, 429/231.95, 300, 303, 304, 306, 309, 316, 317

(56) References Cited

U.S. PATENT DOCUMENTS

| 4,302,518 A | 11/1981 | Goodenough et al. |
| 4,303,748 A | 12/1981 | Armand et al. |
| 4,427,751 A | 1/1984 | Furukawa et al. |

(List continued on next page.)

FOREIGN PATENT DOCUMENTS

| EP | 0693568 | 1/1996 |
| EP | 730316 A 1 | * 9/1996 |
| EP | 0883199 | 12/1998 |

(List continued on next page.)

OTHER PUBLICATIONS

A. Rogier et al., "Effect of Cobalt Substitution on Cationic Distribution in LiNi$_{1-y}$Co$_y$O$_2$ Electrode Materials", *Solid State Ionics*, 90 (1996) pp. 83–90.

N. Ogata, "Conductive Polymer," 1990, pp. 95–109 (w/English translation).

(List continued on next page.)

*Primary Examiner*—Susy Tsang-Foster
(74) *Attorney, Agent, or Firm*—RatnerPrestia

(57) ABSTRACT

A negative electrode of a non-aqueous electrolyte secondary battery contains, as main a component, composite particles constructed in such a manner that at least part of the surface of nuclear particles comprising at least one of tin, silicon and zinc as a constituent element, is coated with a solid solution or an inter-metallic compound composed of elements included in the nuclear particle and at least one element, exclusive of the element included in said nuclear particle, selected from a group of elements in a Periodic Table, comprising group 2 elements, transition elements, group 12 elements, group 13 elements and group 14 elements exclusive of carbon. The batteries of the present invention include non-aqueous electrolytic solution and solid electrolytes comprising polymer gel electrolytes. The construction of the present invention provides a non-aqueous electrolytic secondary battery with which a possibility of the generation of gas is extremely low when stored at high temperatures. It also provides a battery having higher capacity, and superior cycle properties, high-rate charge/discharge properties.

30 Claims, 2 Drawing Sheets

U.S. PATENT DOCUMENTS

| | | | |
|---|---|---|---|
| 4,489,143 | A | 12/1984 | Gilbert et al. |
| 4,495,358 | A | 1/1985 | Koyama et al. |
| 4,632,889 | A | 12/1986 | McManis et al. |
| 4,950,566 | A | 8/1990 | Huggins et al. |
| 5,085,952 | A | 2/1992 | North |
| 5,160,712 | A | 11/1992 | Thackeray et al. |
| 5,223,353 | A | 6/1993 | Ohsawa et al. |
| 5,275,750 | A | 1/1994 | Sato et al. |
| 5,296,318 | A * | 3/1994 | Gozdz et al. |
| 5,395,711 | A | 3/1995 | Tahara et al. |
| 5,460,903 | A * | 10/1995 | St. Aubyn Hubbard et al. |
| 5,536,600 | A | 7/1996 | Kaun |
| 5,587,256 | A | 12/1996 | Wilson et al. |
| 5,589,296 | A * | 12/1996 | Iwamoto et al. |
| 5,624,606 | A | 4/1997 | Wilson et al. |
| 5,665,265 | A * | 9/1997 | Gies et al. |
| 5,677,081 | A | 10/1997 | Iwamoto et al. |
| 5,770,333 | A | 6/1998 | Saito et al. |
| 5,824,434 | A * | 10/1998 | Kawakami et al. ......... 429/209 |
| 5,827,331 | A | 10/1998 | Block et al. |
| 5,900,335 | A | 5/1999 | Nishimura et al. |
| 6,090,505 | A | 7/2000 | Shimamura et al. |
| 6,605,386 | B1 * | 8/2003 | Kasamatsu et al. ...... 429/218.1 |

FOREIGN PATENT DOCUMENTS

| | | |
|---|---|---|
| JP | 63-274058 | 11/1988 |
| JP | 63-276873 | 11/1988 |
| JP | 3-14054 | 1/1991 |
| JP | 3-37964 | 2/1991 |
| JP | 04-095345 | 3/1992 |
| JP | 04-206479 | 7/1992 |
| JP | 04-242890 | 8/1992 |
| JP | 04-249073 | 9/1992 |
| JP | 04-267053 | 9/1992 |
| JP | 05-62712 | 3/1993 |
| JP | 05-234593 | 9/1993 |
| JP | 5-310418 | 11/1993 |
| JP | 06-36798 | 2/1994 |
| JP | 06-098473 | 4/1994 |
| JP | 06-103976 | 4/1994 |
| JP | 6-279049 | 10/1994 |
| JP | 07-240201 | 9/1995 |
| JP | 07-296854 | 11/1995 |
| JP | 7-315822 | 12/1995 |
| JP | 08-250117 | 9/1996 |
| JP | 09-63651 | 3/1997 |
| JP | 09-063651 | 3/1997 |
| JP | 09-259857 | 10/1997 |
| JP | 10-003947 | 1/1998 |
| JP | 10-36120 | 2/1998 |
| JP | 10-316426 | 2/1998 |
| JP | 10-92424 | 4/1998 |
| JP | 10-92424 A * | 4/1998 |
| JP | 10-208741 | 8/1998 |
| JP | 10-257687 | 9/1998 |
| JP | 10-316426 | 12/1998 |
| JP | 10-321225 | 12/1998 |
| JP | 11-135120 | 5/1999 |
| JP | 11-185753 | 7/1999 |
| JP | 11-297311 | 10/1999 |
| JP | 2000-30703 | 1/2000 |
| WO | 96/10538 | 4/1996 |
| WO | 98/07729 | 2/1998 |

OTHER PUBLICATIONS

J.R. MacCallum et al., "Polymer Electrolyte Reviews–2," 1989, pp. 229–305.

K. M. Abraham et al., "Li$^+$–Conductive Solid Polymer Electrolytes with Liquid–Like Conductivity", Journal Electrochem. Society, vol. 137, No. 5, pp. 1657–1658 (1990).

International Search Report corresponding to application No. PCT/JP99/06686 dated Feb. 22, 2000.

M. Armand et al., "Polymeric Solid Electrolytes", Second International Meeting on Solid Electrolytes (1978).

* cited by examiner

NON-AQUEOUS ELECTROLYTE SECONDARY BATTERY COMPRISING COMPOSITE PARTICLES

This Application is a U.S. National Phase Application of PCT International Application No. PCT/JP99/06686, filed Nov. 30, 1999 which is a continuation-in-part of U.S. application Ser. No. 09/090,484, filed Jun. 3, 1998, now U.S. Pat. No. 6,090,505, issued Jul. 18, 2000.

FIELD OF THE INVENTION

The present invention relates to a non-aqueous electrolyte secondary battery (hereinafter, battery), and especially relates to batteries of which electrochemical properties such as the charge/discharge capacity and charge/discharge cycle life have been enhanced by improvements in negative electrode materials and non-aqueous electrolytes.

BACKGROUND OF THE INVENTION

In recent years, lithium secondary batteries with non-aqueous electrolytes, which are used in such fields as mobile communications devices including portable information terminals and portable electronic devices, main power sources of portable electronic devices, domestic portable electricity storing devices, motor cycles using an electric motor as a driving source, electric cars and hybrid electric cars, have characteristics of a high electromotive force and a high energy density.

The lithium ion secondary batteries which contain an organic electrolytic solution, and use carbon materials as negative electrode active materials and lithium-containing composite oxides as positive electrode active materials, have higher voltage and energy density, and superior low temperature properties compared with secondary batteries using aqueous solutions. As these lithium ion batteries do not use lithium metal for the negative electrode, they are superior in terms of cycle stability and safety, thus are now being commercialized rapidly. Lithium polymer batteries using macromolecular (polymer) gel electrolytes which contain an organic electrolytic solution, have been also under development as a new thin and light batteries.

As for polymer electrolyte batteries, various researches have been conducted on the subject since Armand et al. disclosed a polymer electrolyte battery comprising polyethylene oxides and electrolytic salts (Second International Meeting on Solid Electrolytes, Extended Abstracts, p20–22, 1978, U.S. Pat. No. 4,303,748). Although various polymer electrolytic materials have been mentioned, for example, in the conductive polymer edited by Naoya Ogata, Kodansha, 1990, and *Polymer Electrolyte Reviews*, Vol. 1 and 2, Elsevier, London (1987, 1989), ionic conductivity of these polymer electrolytic materials at room temperature is only about $10^{-4}$–$10^{-5}$ S/cm.

As another method to improve ionic conductivity, different types of electrolytes which can easily achieve the ionic conductivity of $10^{-3}$ S/cm have been disclosed, for example, in J. Electrochem, Soc., 137, 1657 (1990), U.S. Pat. No. 5,085,952, U.S. Pat. No. 5,223,353 and U.S. Pat. No. 5,275,750. These electrolytes are called polymer gel electrolyte in which solvents of organic electrolytic solutions are added to polymers as plasticizers. Polymer batteries using these polymer gel electrolytes are expected to achieve the same performance as lithium ion batteries by improving ionic conductivity. However, in respect of capacity, both positive electrode and negative electrodes of these polymer batteries need to be made of composite materials containing polymers as well. Thus, the mass (density) of active materials in the casing of the battery is reduced. Therefore, when the same materials are used for both positive and negative electrodes, energy density of the lithium polymer secondary batteries becomes lower than that of the lithium ion batteries.

When a high-capacity lithium metal is used as a negative electrode material, dendritic deposits are formed on the negative electrode during charging. Over repeated charging and discharging, these dendritic deposits penetrate through separators and polymer gel electrolytes to the positive electrode side, causing an internal short circuit. The deposited dendrites have a large specific surface area, thus their reaction activity is high. Therefore, they react with plasticizers (solvents) of the polymer gel electrolytes, lowering charge/discharge efficiency. Due to these reasons, the lithium secondary batteries using lithium metal as a negative electrode material have a low reliability and a short cycle life.

To suppress the formation of such dendrites, it has been disclosed that lithium alloys such as lithium-aluminum alloy and a wood's alloy are used instead of lithium metal. Metals capable of forming alloys with lithium and alloys containing at least one such metal can be used as a negative electrode material with a relatively high electrochemical capacity in the initial charge/discharge cycle. However, by repeatedly alloying with and de-intercalating lithium, they may undergo a phase change even when the crystal structure of the original skeletal alloy is maintained, or sometimes, the crystal structure of the skeletal alloy of elements changes. In this case, particles of the metal or alloy which are host materials of the lithium, an active material, swell and shrink. As the charge/discharge cycle proceeds, crystal grains are stressed and cracked, thus particles are pulverized and come off from the electrode plate. As the crystal grains are pulverized, resistance and contact resistance of the grain boundaries increase. As a result, resistance polarization during charging and discharging increases. Thus, when charging is conducted at a controlled voltage level, charging depth becomes shallow, limiting the amount of electricity charged in the battery. On the other hand, during discharging, the voltage drop occurs by the resistance polarization, reaching the discharge-termination voltage early. Thus, superior charge/discharge capacity and cycle properties can not be expected.

If currently used solvents such as ethylene carbonate, dimethyl carbonate, diethyl carbonate, ethyl methyl carbonate, propylene carbonate, gamma-butyro lactone, and gamma-valero lactone are used in a system in which lithium metal or a lithium alloy is used in a negative electrode, the electrolyte may decompose and gas may be produced when the battery is fully charged and stored at high temperatures. Moreover, if the battery is repeatedly charged and discharged, parallel to the charge/discharge reaction of the negative electrode, the electrolyte is gasified, lowering the charge/discharge efficiency, resulting in decreased cycle properties.

Nowadays, lithium secondary batteries which use, as a negative electrode material, carbon materials capable of intercalating and de-intercalating lithium ions, are commercially available. In general, lithium metal does not deposit on carbon negative electrodes. Thus, short circuits are not caused by dendrite. However, the theoretical capacity of graphite which is one of currently used carbon materials is 372 mAh/g, only one tenth of that of pure Li metal.

If graphite-group carbon materials are used as a negative electrode material, and propylene carbonate is adopted for an electrolytic solution, the electrolytic solution is decomposed at potentials more precious than that of lithium metal. Consequently, lithium ions are not intercalated between layers of graphite, and the battery does not function. Considering these points, currently commercialized lithium secondary batteries with the graphite-group used for negative electrode materials frequently use electrolytic solution containing ethylene carbonate. However, the melting point of ethylene carbonate is 37° C. higher than room temperature. Therefore, at low temperatures, ionic conductivity of the electrolytic solution for lithium ions plummets, lowering charge/discharge priorities.

When inorganic compound materials such as TiS2 are used as a negative electrode active material, intercalation and de-intercalation of lithium occur at sufficiently more precious potentials compared with lithium metal and lithium alloys. Thus, even when the negative electrode active materials come in contact with the electrolytic solution, reductive decomposition does not occur. Moreover, even when propylene carbonate is used for the electrolytic solution, intercalation and de-intercalation are not impeded by decomposition as is the case with the graphite materials, therefore, a wider range of electrolytic solutions is applicable. However, potentials of the negative electrode using the foregoing inorganic compound materials is precious, causing voltage of the battery to inevitably become low. This is a disadvantage of achieving higher energy density.

Regarding the supporting electrolytes, the thermal stability of $LiClO_4$, $LiBF_4$, and $LiPF_6$ needs to be improved. Furthermore, above fluorine-containing inorganic anion salts react with minute amounts of water contained in an electrolytic solution and decompose.

To form a totally solid-state battery by using, as non-aqueous electrolytes and lithium ion conductor glass-type solid electrolytes, solid electrolytes in powder form need to be mixed in the electrode to secure and maintain ionic conductivity in the electrode. However, electrodes constructed in the manner mentioned above are brittle, and incapable of absorbing expansion and shrinkage of the electrode materials that occur during charging and discharging. In other words, the electrode itself merely expands as it lacks resilience. Therefore, once it expands, it does not shrink. Therefore, some particles fail to contact with one another properly, increasing the number of particles in the electrode material which can not contribute to charging and discharging. As a result, the properties of the battery are lowered.

Other known negative electrode materials include pure metallic materials and pure non-metallic materials which form compounds with lithium. For example, composition formulae of compounds of tin (Sn), silicon (Si) and zinc (Zn) with the maximum amount of lithium are respectively $Li_{22}Sn_5$, $Li_{22}Si_5$, and LiZn. Within the range of these composition formulae, metallic lithium does not normally deposit. Thus, an internal short circuit is not caused by dendrite. Furthermore, the electrochemical capacities between these compounds and each element mentioned above are respectively 993 mAh/g, 4199 mAh/g and 410 mAh/g; all are larger than the theoretical capacity of graphite.

As other compound negative electrode materials, the Japanese Patent Laid-Open Publication No. H07-240201 discloses a non-metallic siliside comprising transition elements. The Japanese Patent Laid-Open Publication No. H09-63651 discloses negative electrode materials which are made of inter-metallic compounds comprising at least one of group 4B elements, P and Sb, and have a crystal structure of one of the $CaF_2$ type, the ZnS type and the AlLiSi type.

However, the foregoing high-capacity negative electrode materials have the following problems.

Negative electrode materials of pure metallic materials and pure non-metallic materials which form compounds with lithium have inferior charge/discharge cycle properties compared with carbon negative electrode materials. The reason for this is assumed to be the destruction of the negative electrode materials caused by their volume expansion and shrinkage.

On the other hand, as negative electrode materials with an improved cycle life property unlike the foregoing pure materials, the Japanese Patent Laid-Open Publication No. H07-240201 and the Japanese Patent Laid-Open Publication No. H09-63651 respectively disclose non-metallic silisides composed of transition elements and inter-metallic compounds composed of at least one of group 4B elements, P and Sb, and which have a crystal structure of one of the $CaF_2$ type, the ZnS type and the AlLiSi type.

Batteries using the negative electrode materials of the non-metallic silisides composed of transition elements are disclosed in the Japanese Patent Laid-Open Publication No. H07-240201. The capacities of the embodiments of the invention and a comparative example at the first cycle, the fiftieth cycle and the hundredth cycle suggest that the batteries of the invention have improved charge/discharge cycle properties compared with lithium metal negative electrode materials. However, when compared with a natural graphite negative electrode material, the increase in the capacity of the battery is only about 12%.

The materials disclosed in the Japanese Patent Laid-Open Publication No. H09-63651 have a better charge/discharge cycle property than a Li—Pb alloy negative electrode material according to an embodiment and a comparative example. The materials also have a larger capacity compared with a graphite negative electrode material. However, the discharge capacity decreases significantly up to the 10–20th charge/discharge cycles. Even when $Mg_2Sn$, which is considered to be better than any of the other materials, is used, the discharge capacity decreases to approximately 70% of the initial capacity after about the 20th cycle. Thus, their charge/discharge properties are inferior.

SUMMARY OF THE INVENTION

The present invention relates to a non-aqueous electrolyte secondary battery comprising:

a positive electrode and a negative electrode capable of intercalating and de-intercalating lithium, and as non-aqueous electrolytes, lithium ion conductive glass-type solid electrolytes, or polymer gel electrolytes using a polymer comprising at least one of;

polyalkylene oxides or their derivatives, specific polymers which containing fluorine, polyacrylonitrile, polyester, and copolymers of methacrylate and ethylene oxides.

The negative electrode is characterized by its main material which uses composite particles constructed in such a manner that at least part of the surrounding surface of nuclear particles containing at least one of tin, silicon and zinc as a constituent element, is coated with a solid solution or an inter-metallic compound composed of an element included in the nuclear particles and at least one element (exclusive of the elements included in the nuclear particles)

selected from a group comprising group 2 elements, transition elements, group 13 elements and group 14 elements (exclusive of carbon) of the Periodic Table. With the foregoing construction, an internal short circuit between the positive electrode and the negative electrode caused by the expansion of the negative electrode materials can be restricted, thereby achieving high capacity, high energy density batteries with superior charge/discharge cycle properties.

The lithium ion conductive glass-type solid electrolytes of the present invention includes; at least lithium sulfide as a first component; one or more compounds selected from silicon sulfides, phosphor sulfides and boron sulfides as a second component; and one or more compounds selected from lithium phosphate, lithium sulfate, lithium borate, lithium silicate as a third component. The lithium ion conductive glass-type solid electrolytes is synthesized with above three components.

The construction of the present invention achieves novel non-aqueous electrolytic secondary batteries which rarely suffer generation of gas when stored at high temperatures. Moreover, even when the batteries are repeatedly charged and discharged, charge/discharge efficiency of their negative electrode does not decrease. The batteries can be used in a wide range of temperatures. Furthermore, the batteries enjoy high energy density and a lower reduction rate of discharge capacity when used repeatedly as well as high charge/discharge properties.

DETAILED DESCRIPTION OF PREFERRED EMBODIMENTS

Figure 1:
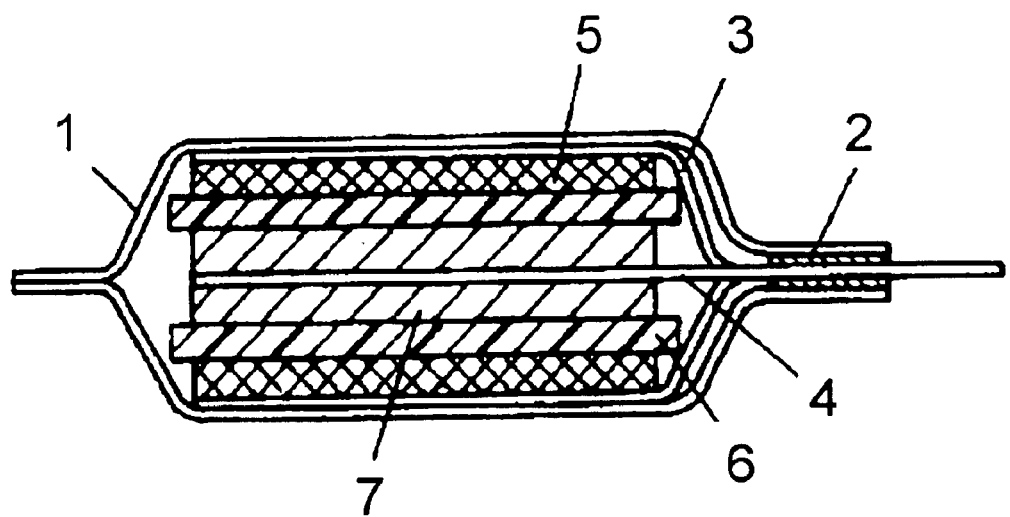
FIG. 1 shows a cross-section of a flat type non-aqueous electrolyte battery of the present invention.

As a negative electrode material used in the present invention, composite particles whose nuclear particles composed of solid phase A are coated with solid phase B over the whole surface or part of the surface, are used. The solid phase A contains at least one of tin, silicon and zinc as a constituent element. The solid phase B is composed of a solid solution or inter-metallic compounds composed of at least one of tin, silicon and zinc and at least one element (exclusive of the foregoing constituent elements) selected from a group comprising group 2 elements, transition elements, group 12 elements, group 13 elements and group 14 elements (exclusive of carbon) of the Periodic Table. Hereinafter, the foregoing negative electrode materials are called "composite particles". When the composite particles are used as a negative electrode material, the solid phase B helps to suppress expansion and shrinkage of the solid phase A caused by charging and discharging, thereby achieving a negative electrode material with superior charge/discharge cycle properties.

It can be considered that the solid phase A of the negative electrode material of the present invention mainly contributes to a higher charge/discharge capacity since it contains at least one of Sn, Si and Zn. The solid phase B which coats the whole or part of the surrounding surface of the nuclear particles comprising the solid phase A, contributes to improvement of the charge/discharge cycle properties. The amount of lithium contained in the solid phase B is normally less than that contained in metal, a solid solution or an inter-metallic compound.

In other words, the negative electrode material used in the present invention is constructed such that particles containing at least one of high-capacity Sn, Si and Zn as a constituent element, are coated with the solid solution or the inter-metallic compound, which are resistant to pulverization. The solid solution or the inter-metallic compounds in the coating layer prevent significant changes in crystal structure, namely changes in volume of the nuclear particles caused by electrochemical intercalating and de-intercalating of lithium. In this manner, pulverization of nuclear particles is restricted.

The following is a manufacturing method of composite particles used for the negative electrode materials.

In one manufacturing method of the composite materials, a fused mixture of elements contained in the composite particles at a predetermined composition ratio is quenched and solidified by dry-spraying, wet-spraying, roll-quenching or turning-electrode method. The solidified material is heat treated at the temperature lower than the solid line temperature of a solid solution or inter-metallic compounds. The solid line temperature is determined by the composition ratio. The process of quenching and solidifying of the fused mixture allows the solid phase A to deposit as a nucleus of a particle, and at the same time, allows the solid phase B, which coats part of or the whole surface of the solid phase A, to deposit. The heat treatment following the foregoing process enhances evenness of the solid phase A and the solid phase B. Even when the heat treatment is not conducted, composite particles suitable for the present invention can be obtained. Apart from the quenching method mentioned above, other methods are applicable providing they can cool the fused mixture rapidly and adequately.

In another manufacturing method, a layer of deposits comprising essential elements in forming solid phase B is formed on the surface of the powder of the solid phase A. The layer is treated at temperatures lower than the solid line temperature. This heat treatment allows constituent elements within the solid phase A to disperse throughout the deposit layer to form the solid phase B as a coating layer. The deposit layer can be formed by plating or by a mechanical alloying method. In the case of the mechanical alloying method, the heat treatment is not necessary. Other methods can also be used on the condition that they can form the surface deposit layer.

As a conductive material for the negative electrode, any electronic conduction materials can be used. Examples of such materials include graphite materials including natural graphite (scale-like graphite), synthetic graphite and expanding graphite; carbon blacks such as acetylene black, Ketzen black (highly structured furnace black), channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, synthetic graphite, acetylene black and carbon fibers are especially favorable.

The total amount of the conductive materials is not specifically defined, however, 1–50 wt %, especially 1–30% of the negative electrode materials is desirable. As negative electrode materials (composite particles) of the present invention are themselves conductive, even if conductive materials are not added, the battery can still actually function. Therefore, the battery has more room available to contain composite particles.

Binders for the negative electrode can be either thermoplastic resin or thermosetting resin. Desirable binders for the present invention includes the following materials; polyethylene, polypropylene, poly-tetrafluoroethylene (PTFE), polyvinylidene fluoride (PVDF), styrene-butadiene rubber, a tetrafluoroethylene-hexafluoropropylene copolymer (FEP), a tetrafluoroethylene-perfluoroalkyl vynyl ether copolymer (PFA), a vinyliden fluoride-hexafluoropropylene copolymer, a vinyliden fluoride-chlorotrifluoroethylene copolymer, a ethylene-tetrafluoroethylene copolymer (ETFE), poly chlorotrifluoroethylene (PCTFE) a vinyliden fluoride-pentafluoropropylene copolymer, a propylene-tetrafluoroethylene copolymer, a ethylene-chlorotrifluoroethylene copolymer (ECTFE), a vinyliden fluoride-hexafluoropropylene-tetrafluoroethylene copolymer, a vinyliden fluoride perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene methyl methacrylate copolymer or its Na+ ion crosslinking body. Favorable materials among these materials are styrene butadiene rubber, polyvinylidene fluoride, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene methyl methacrylate copolymer or its Na+ ion crosslinking body.

As a current collector for the negative electrode, any electronic conductor can be used on the condition that it does not chemically change in the battery. For example, stainless steel, nickel, copper, titanium, carbon, conductive resin, as well as copper and stainless steel whose surfaces are coated with carbon, nickel or titanium can be used. Especially favorable materials are copper and copper alloys. Surfaces of these materials can be oxidized. It is desirable to treat the surface of the current collector to make it uneven. Usable forms of the foregoing materials as the current collector include a foil, a film, a sheet, a mesh sheet, a punched sheet a lath form, a porous form, a foamed form and a fibrous form. The thickness is not specifically defined however, normally those of 1–500 μm in thickness are used.

As positive electrode active materials, lithium containing compounds or compounds not containing lithium can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, and x=0–1, Y=0–0.9, z=2.0–2.3). The value of x is the value before charging and discharging, thus it changes along with charging and discharging. Other usable positive electrode materials include transition metal chalcogenides, a vanadium oxide and its lithium compounds, a niobium oxide and its lithium compounds, a conjugate polymer using organic conductive materials, and shevril phase compounds. It is also possible to use a plurality of different positive electrode materials in a combined form. The average diameter of particles of the positive electrode active materials is not specifically defined, however, desirably it is 1–30 μm.

Conductive materials for the positive electrode can be any electronic conductive material on the condition that it does not chemically change within the range of charge and discharge electric potentials of the positive electrode materials in use. Examples of such materials include graphite materials including natural graphite (scale-like graphite) and synthetic graphite; carbon black materials such as acetylene black, Ketzen black, channel black, furnace black, lamp black and thermal black; conductive fibers such as carbon fibers and metallic fibers; fluorinated carbon; metal powders such as aluminum; conductive whiskers such as a zinc oxide and potassium titanate, conductive metal oxides such as a titanium oxide, and organic conductive materials such as polyphenylene derivatives. These materials can be used independently or in combination. Among these conductive materials, synthetic graphite and acetylene black are especially favorable. The total amount of the conductive materials to be added is not specifically defined, however, 1–50 wt %, especially 1–30% of the positive electrode materials is desirable. In the case of carbon and graphite, 2–15 wt % is especially favorable.

Binders for the positive electrode can be either thermoplastic resin or thermosetting resin. The binders for the negative electrode mentioned earlier can be used effectively, however, PVDF and PTFE are more preferable.

Current collectors for the positive electrode of the present invention can be any electronic conduction materials on the condition that it does not chemically change within the range of charge and discharge electric potentials of the positive electrode materials in use. For example, the current collectors for the negative electrode mentioned earlier can be used preferably. The thickness of the current collectors is not specifically defined, however, those of 1–500 μm in thickness are used.

As electrode mixtures for the positive electrode and the negative electrode plates, conductive materials, binders, fillers, dispersants, ionic conductors, pressure enhancers, and other additives can be used. Any fiber materials which do not change chemically in the battery can be used as fillers. In general, fibers made of olefin polymers such as polypropylene and polyethylene, and fibers made of glass and carbon are used as fillers. The amount of the filler to be added is not specifically defined however, it is desirably 0–30 wt % of the electrode binders.

As for the construction of the positive electrode and the negative electrode, it is favorable that at least the surfaces of the negative electrode and the positive electrode where the electrode mixtures are coated are facing each other.

The following is a detailed description of the materials used in the batteries of the present invention.

The positive electrode and the negative electrode of the battery of the present invention are constructed such that a current collector is coated with a mixture layer which includes the positive electrode active materials and the negative electrode materials capable of electrochemically and reversibly intercalating and de-intercalating lithium ions as main constituents, and conductive materials as well as binders.

(Manufacture of the Composite Particles)

In Table 1, components (pure elements, inter-metallic compounds, solid solution) of the solid phase A and the solid phase B of the composite particles used in the preferred embodiments of the present invention, composition ratios of elements, fusing temperatures, and solid phase line temperatures are shown. Commercially available highly pure reagents are used as ingredients for each element.

To obtain solid materials, powder or a block of each element contained in the composite particles is put into a fusing vessel in the composition ratio shown in Table 1, and fused at the temperature also shown in Table 1. The fused mixture is quenched by the roliquenching method and solidified to form a solid material which is then heat treated at temperatures of 10° C.–50° C. lower than the solid phase line temperatures shown in Table 1, in an inert atmosphere for 20 hours. After being heat treated, the material is ground with a ball mill, and classified using a sieve to prepare composite particles of 45 μm or less. An electron microscope observation confirmed, part of or the whole surface of the solid phase A are covered with the solid phase B.

Regarding constituent elements of the negative electrode materials, when the solid phase A is Sn, Mg selected from group 2 elements, Fe and Mo from transition elements, Zn and Cd from group 12 elements, In from group 13 elements and Pb from group 14 elements are used. However, similar results are obtained with other elements selected from each group. The composition ratio of the constituent elements of the negative electrode material is not specifically defined, on the condition that two phases are created and one of which (solid phase A) is mainly composed of Sn, and partly or entirely covered with the other phase (solid phase B). The solid phase A can be composed not only of Sn but also traces of other elements such as o, C, N, S, Ca, Mg, Al, Fe, W, V, Ti, Cu, Cr, Co, and P.

When the solid phase A is Si, Mg selected from group 2 elements, Co and Ni from transition elements, Zn from group 12 elements, Al from group 13 elements and Sn from group 14 elements are used. However, similar results are obtained with other elements selected from each group. Similarly, when the solid phase A is Zn, Mg from group 2 elements, Cu and V from transition elements, Cd from group 12 elements, Al from group 13 elements and Ge from group 14 elements are used. However, similar results are obtained with other elements selected from each group. The composition ratio of the constituent elements of the negative electrode material is not specifically defined, on the condition that two phases are created and one of which (solid phase A) is mainly composed of Si and Zn, and partly or entirely covered with the other phase (solid phase B). The solid phase A can be composed not only of Si and Zn but also traces of elements such as O, C, N, S, Ca, Mg, Al, Fe, W, V, Ti, Cu, Cr, Co, and P.

(Negative Electrode Plate)

To prepare the negative electrode plate 6, 20 wt % of carbon powder and 5 wt % of PVDF are mixed with 75 wt % of the composite particles synthesized under the foregoing conditions. The mixture is dispersed in dehydrated N-methyl pyrrolidone to form a slurry. The slurry is coated onto a negative electrode current collector comprising copper foil, dried and rolled under pressure. Instead of PVDF, polymers comprising a polymer gel electrolyte are used as well.

(Positive Electrode Plate)

To prepare the positive electrode plate 5, 10 wt % of carbon powder and 5 wt % of PVDF are mixed with 85 wt % of lithium cobaltate powder. The mixture is dispersed in dehydrated N-methyl pyrrolidinone to form a slurry. The slurry is coated onto a positive electrode current collector comprising copper foil, and dried and rolled under pressure. Instead of PVDF, polymers composing a polymer gel electrolyte are used as well.

(Polymer Gel Electrolyte)

As a polymer of the polymer gel electrolyte, polymers whose main structure are alkylene oxides or their derivatives such as polyethylene oxides and polypropylene oxides are used. Alkylene oxides have comparatively low melting points as polymer materials, and, lithium salts can largely dissolve into them. As such, they are very easy to handle. Although their ionic conductivity is low, this problem can be solved by using organic solvents as a plasticizer.

Other polymers that can be used as a polymer gel electrolyte include copolymers of two or three compounds selected from a group comprising vinylidene fluoride, hexafluoro propylene, tetrafluoro ethylene, and perfluoroalkyl vinyl ether. Copolymers of vinylidene fluoride and hexafluoro propylene are especially favorable. These copolymers are chemically stable and can be thermally welded. With these copolymers, porous film can be produced in the following steps. The copolymers are dissolved into solvents such as tetrahydrofuran (THF) and acetone along with a plasticizer such as phthalic acid ester. The solvent is cast and dried to obtain a film. The plasticizer is then removed by using solvents such as ether to obtain a porous film. If an electrolytic solution is injected into this porous film, a gel electrolyte can be obtained. Thus, after forming an integrated construction of an electrode, an electrolytic solution can be injected to produce gel electrolytes.

Other polymers used for the polymer gel electrolytes include polyacrylonitrile or polyacrylonitrile derivative polymers using polyacrylonitrile as a main component and copolymerized with methyl acrylate, vinyl pyrrolidone or vinyl acetate. These polymers can be used as polymer alloys with fluorocarbon resins, polyolefin resins, polyether resins and the like. Polyacrylonitrile polymers can be used for a wide range of purposes. They can be dissolved into solvents such as dimethyl formamide, or can be mixed with an organic electrolytic solution and heated and dissolved, these solutions can be then cast to produce a film. Furthermore, a gel film can be formed by soaking a non-woven porous material in the foregoing solution, heating it and then cooling it. The gel film formed in this manner is fire retardant, and can be handled with ease.

Other polymers used for the polymer gel electrolyte include polyester polymers using polyethylene terephthalate, polybutylene terephthalate or their derivatives used as a main component and copolymerized with ethyl methacrylate, styrene or vinyl acetate. These polyester polymers can also be used as polymer alloys with fluorocarbon resins, polyolefin resins, poly ether resins and the like. Polyester polymers are widely used, and, with these polymers, chemically stable, flexible and mechanically strong films can be produced.

Other polymers used for the polymer gel electrolyte further include copolymers of methacrylate and ethylene oxides. A gel electrolyte layer can be formed by casting a solution comprising a mixed solution of ethyl methacrylate, ethylene glycol dimethactylate, and polyethylene oxides of molar weight 10000 or less, an organic solution and a polymerization initiator, onto positive electrode and negative electrodes and directly polymerizing it on the electrodes by using heat or irradiating ultraviolet lights.

The electrolytic solution to be included in the polymer gel electrolyte is composed of non-aqueous solvents and lithium salts dissolved in them. Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; gamma-lactones such as gamma-butyrolactone; acyclic ethers such as 1,2-dimethoxy ethane (DME), 1,2-diethoxy ethane (DEE), and ethoxy methoxy ethane (EME); cyclic ethers such as tetrahydrofuran and 2-methyl tetrahydrofuran; and non-protonic organic solvents such as dimethyl sulfoxide, 1,3-dioxolane, formamide, acetamide, dimethyl formamide, dioxolane, acetdnitrile, propylnitrile, nitromethane, ethyl monoglime, triester phosphate, trimethoxy methyne, dioxolane derivatives, sulfolane, methyl sulfolane, 1,3-dimethyl- 2-imidazolidinone, 3-methyl-2-oxazolidinone, propylene carbonate derivatives, tetrahydrofuran derivatives, ethyl ether, 1,3-propane saltane, anisole, dimethyl sulfoxide and N-methyl pyrolidon, These solvents are used independently or as a mixture of two or more solvents. Mixtures of cyclic carbonate and acyclic carbonate, or cyclic carbonate, acyclic carbonate and aliphatic carboxylate are especially favorable.

Lithium salts which dissolve into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, Li $(CF_3SO_2)_2$, $LiAsF_6$, LiN $(CF_3SO_2)_2$, $LiB_{10}Cl_{10}$, lithium salt of lower aliphatic carboxylic acid, LiCl, LiBr, LiI, chloroborane lithium, 4-phenil boric acid, and an imide derivatives. These lithium salts can be dissolved individually or as a mixture of two or more in the non-aqueous solvents mentioned earlier, and used as an electrolytic solution. It is preferable to include $LiPF_6$ in the electrolytic solution.

Especially favorable non-aqueous electrolytic solutions of the present invention include at least ethylene carbonate and ethyl methyl carbonate, and as a supporting salt, $LiPF_6$. The amount of the electrolytic solution to be added to the battery is not specifically defined. Considering the amount of the positive electrode and the negative electrode materials and the size of the battery, the required amount can be used. The amount of the supporting electrolytes to be dissolved against the non-aqueous electrolytes is not specifically defined, however, 0.2–2 mol/l is favorable, and particularly, 0.5–1.5 mol/l is preferable.

It is effective to add other compounds to the electrolytic solution in order to improve discharge and charge/discharge properties. Such compounds include triethyl phosphite, triethanolamine, cyclic ethers, ethylenediamine, n-grime, pyridine, hexaphosphic acid triamide, nitrobenzene direvatives, crown ethers, quaternary ammonium salt, and ethylene glycol dialkyl ether.

In the separator section of the battery of the present invention, structural reinforcements such as particulate dispersants, fillers, non-woven cloths and the like are included. As the structural reinforcements, any particulates and fiber materials which do not chemically change by reacting with organic electrolytic solutions and polymer materials can be used. Especially, silica whose surface is modified with hydrophobic properties (for example by silane coupling treatments), particulates of oxides of such materials as alumina (particle diameter of 1 μm or less), fibers and non-woven cloths of olefin polymers such as polypropylene and polyethylene can be used. The amount of the structural reinforcements to be added is not particularly limited however, a favorable amount is within the range of 0–40 wt % of the separator section comprising polymer gel electrolytes.

By combining novel negative electrode materials and polymer materials of the present invention, lithium polymer secondary batteries with superior cycle properties and reliability and high energy density can be achieved.

Besides the foregoing polymer gel electrolytes, the present invention can also use lithium ion conductive glass-type solid electrolytes (hereinafter, solid electrolyte).

The solid electrolyte of the present invention is synthesized with three components comprising; at least lithium sulfide as a first component, one or more compounds selected from a group comprising silicon sulfides, phosphor sulfides and boron sulfides as a second component, and at least one compound selected from lithium phosphate, lithium sulfate, lithium borate, lithium silicate as a third component. The composition ratio of the solid electrolytes at the time of synthesis is not specifically limited on the grounds that synthesized material is in the form of glass, has ionic conductivity of lithium ions and its oxidative decomposition voltage is higher than the voltage at which the battery is used.

The solid electrolytes of the present invention is highly thermally stable with the glass transition temperature being 300° C. or higher, and the crystallization temperature, 400° C. or higher. As such, when the battery is stored at high temperatures, the generation of gas and degradation of the properties are extremely small. Since the solid electrolytes are in the form of glass, conduction paths of lithium ions are different from those of crystalline solid electrolytes; the paths are isotropic and conductivity can be obtained at any surface of the solid electrolyte powder. Therefore, when mixed with the electrode materials in powder form, contacting surfaces can be set freely.

When the solid electrolytes include oxo-acid salts as a third component, oxidative decomposition resistance voltage is increased to almost 10V, significantly higher compared with those to which oxo-acid salts are not added. The reason for this is assumed to be that when oxo-acid salts are not added, the glass skeleton is composed of Si—S—Si, whereas when the salts are added, in some part, an Si—O—Si skeleton whose Si—O bonding is stronger than Si—S bonding, is formed. Thus, the solid electrolytes of the present invention have high bonding strength, therefore, they can be used with positive electrode materials which generate voltage as high as 4V or more.

When oxo-acid salts are not added, and the solid electrolytes come into contact with lithium metal, the impedance at the contacting surfaces increases over time. However, by adding oxo-acid salts, the increase in impedance which occurs when the solid electrolytes come in contact with lithium metal, is restricted. Thus, the solid electrolytes of the present invention have an increased stability against contact with lithium metal.

By combining the foregoing negative electrode materials and the solid electrolytes of the present invention, high-capacity batteries with secure reliability in wider range of temperatures and superior cycle properties are achieved.

Constructions of the batteries of the present invention is described below using representative flat-type and cylindrical batteries for example in accordance with preferred embodiments. The present invention is not limited to these embodiments.

The First Preferred Embodiment

FIG. 1 shows a cross section of a flat-type non-aqueous electrolyte battery. The battery comprises:

a battery casing 1 made with an aluminum laminate;

a welding seal for leads 2;

an aluminum positive electrode lead 3;

a positive electrode plate 5 using lithium composite oxides as an active material;

a separator section 6 of gel polymer electrolytes comprising polymer materials such as polyethylene oxides, an electrolytic solution and structural reinforcements;

a negative electrode plate 7 using composite particles of the present invention as an active material; and a copper negative electrode lead 4.

For a polymer material of the gel polymer electrolytes, polyethylene oxides (PEO) whose molecular weight is between 800,000 and 2 million.

PEO is used by dissolving it in a mixed solution of acetone and ethylene carbonate (EC). Further, the composite particles of the present invention, which function as an active material and carbon black used as a conductive material are mixed and dispersed into the foregoing solution to form a paste. The paste is coated onto a copper core material used as a negative electrode current collector. The solvents are then dried and removed from the paste, and then it is cut into a predetermined size to form the negative electrode plate 7.

The positive electrode plate 5 is prepared such that the paste which is formed by mixing and dispersing $LiCoO_2$ and carbon black in the foregoing PEO solution, is coated on an aluminum core material which functions as a positive electrode current collector, and then processed in the same manner as the negative electrode plate 7.

The separator section 6 is produced in such a manner that PEO is dissolved in an organic electrolytic solution by heating. A polypropylene non-woven fabric functioning as a structural reinforcement, is then used to absorb the solution. Finally the items are cooled to form a gel electrolytic layer.

The positive electrode plate 5, the separator section 6 and the negative electrode plate 7 are laminated under pressure to form an electrode group which is then put inside the battery casing 1. The laminated film around the opening is then thermally welded to obtain a flat-type battery. If gelation or lamination of the electrodes and the separator section is not adequate, a heating process can be applied before sealing the opening.

As the electrolytic solution, $LiPF_6$ is dissolved into a solvent of EC and EMC mixed in a ratio of 1:1 by volume, at the concentration of 1.0 mol/l $LiPF_6$.

The batteries of the present invention are charged with a constant current of 5 mA until their voltage becomes 4.1V, and then discharged at the constant current of 5 mA until their voltage becomes 2.0V at 20° C. The charge/discharge cycle is repeated 100 times, and the ratio of the discharge capacity at the 100th cycle to that of the initial cycle is shown in Table 2 as the capacity retention rates.

For comparison, a battery is prepared in the same manner as the first preferred embodiment by using spherical graphite as a negative electrode material, and PEO as a polymer material. Results are shown in Table 2.

As shown in Table 2, the use of the polymer gel electrolytes and the composite particles of the present invention achieves non-aqueous electrolyte secondary batteries which have higher energy density and a higher capacity compared with the battery with conventional carbon materials, and also enjoy superior cycle properties and reliability.

The Second Preferred Invention

Instead of the polymer material in the first preferred embodiment, a copolymer of vinylidene fluoride-hexafluoropropylene (PVDF-HFP) is used. A composite particle material C and carbon black which is a conductive material, are mixed with PVDF-HFP, and then mixed and dispersed in a mixed solution of N-methyl pyrrolidone and a dibutyl phthalate to form a paste. The paste is coated onto a copper core material used as a negative electrode current collector, and then dried before being cut into a predetermined size to form the negative electrode plate. The positive electrode plate is prepared such that paste, which is formed by mixing and dispersing $LiCoO_2$, carbon black and PVDF-HFP into the mixed solution of N-methyl pyrrolidone and a dibutyl phthalate, is coated onto an aluminum core material which functions as a positive electrode current collector, and then processed in the same manner as the negative electrode plate. Separators are produced such that PVDF-HFP and silicon oxide particulates having hydrophobic properties, and which function as a structural reinforcement, are dispersed into the foregoing mixed solution to obtain a paste dispersion. The paste dispersion is coated and dried. The positive electrode plate, the separators and the negative electrode plate are then welded by a heated roller. Diethyl ether is used in order to have dibutyl phthalate, a plasticizer, dissolve into it so as to obtain a porous polymer electrode group. This electrode group is then placed into the battery casing 1 before being injected with the organic electrolytic solution used in the first preferred embodiment in order to form a gel polymer electrolyte. To complete, the laminated film around the opening is thermally welded.

An evaluation of the batteries is shown in Table 2. As shown in Table 2, by using the polymer gel electrolytes and the composite particles of the present invention, a high-energy density non-aqueous electrolyte secondary battery with a higher capacity than the battery with conventional carbon materials, and with superior cycle properties and reliability can be achieved.

The Third Preferred Embodiment

Instead of the polymer material in the first preferred embodiment, a polyacrylonitrile (PAN) is used as a polymer material. The composite particle of the present invention and carbon black, a conductive material are mixed and dispersed into a solution prepared by dissolving PAN into dimethyl formamide, a solvent, to form a paste. The paste is coated onto a copper core material used as a negative electrode current collector to obtain the negative electrode plate. The positive electrode plate is produced by using a paste prepared by mixing and dispersing $LiCoO_2$, carbon black and PAN. The positive and the negative electrode plates are washed with acetone or ethanol to remove dimethyl formamide.

A non-woven fabric like film made of PAN is used for the separators.

The positive electrode plate, the separators and the negative electrode plate are laminated to form an electrode group. The organic electrolytic solution used in the first preferred embodiment is injected into the electrode group which is then sandwiched between hot plates and heated under pressure before being cooled down. By this process, the electrode group is integrated and the electrolytic solution gels. The electrode group is then placed in the battery casing 1 and sealed.

An evaluation of the batteries is shown in Table 2. As shown in Table 2, by using the polymer gel electrolytes and the composite particles of the present invention, a high-energy density non-aqueous electrolyte secondary battery with a higher capacity than the battery with conventional carbon materials, and with superior cycle properties and reliability can be achieved.

The Fourth Preferred Embodiment

Instead of the polymer material in the first preferred embodiment, polyester polymers (PET) which are copolymers of polybutylene terephthalate and ethyl methacrylate, are used as a polymer material. The polymer material is dissolved in a mixed solvent of formic acid and ethyl acetate. A composite particle material C and carbon black are then added to the mixed solvent to form a paste. Subsequently, the paste is coated onto a core material and dried to form the negative electrode plate in the same manner as the first preferred embodiment.

The positive electrode plate is produced by using a paste prepared by mixing and dispersing $LiCoO_2$, carbon black and PET.

To prepare the separators, a polypropylene non-woven fabric which acts as a structural reinforcement is used to absorb PET, and then, in order to make the separators porous, it is dried and the solvents are removed.

The positive electrode plate, the separators and the negative electrode plate are laminated to form an electrode group. The organic electrolytic solution used in the first preferred embodiment is injected into the electrode group which is then sandwiched between hot plates and heated under pressure before being cooled down. By this process, the electrode group is integrated and the electrolytic solution gels. The electrode group is then placed in the battery casing 1 and sealed.

An evaluation of the batteries is shown in Table 2. As shown in Table 2, by using the polymer gel electrolytes and the composite particles of the present invention, a high-energy density non-aqueous electrolyte secondary battery with a higher capacity than the battery with conventional carbon materials, and also with superior cycle properties and reliability can be achieved.

The Fifth Preferred Embodiment

Instead of the polymer material in the first preferred embodiment, a polymer material, an aqueous solution including a Na+ ion crosslinked body of an ethylene-methacrylic acid copolymer as a binder and a carboxymethyl cellulose as a thickener, is used. The composite particles of the present invention and carbon black are mixed and dispersed in the aqueous solution to form a paste. The paste is then used to prepare the negative electrode plate. The foregoing solution is also used to prepare the positive electrode plate.

Subsequently, a solution comprising a mixed solution of ethylene glycol dimethacrylate and polyethylene oxides of molecular weight of 10,000 or less, the organic electrolytic solution, the same as that of the first preferred embodiment, a photo-polymerization initiator and a polypropylene filler, used as a structural reinforcement, is cast on the positive and the negative plates. Ultraviolet lights are then irradiated onto the electrode plates in an argon atmosphere. In this manner, the material with the foregoing composition is photo-polymerized directly to form a gel electrolyte layer (PMMA-PEO) on the surfaces of the electrode plates, which are then laminated.

An evaluation of the batteries is shown in Table 2. As shown in Table 2, by using the polymer gel electrolytes and the composite particles of the present invention, a high-energy density non-aqueous electrolyte secondary battery with a higher capacity than the battery with conventional carbon materials, and also with superior cycle properties and reliability can be achieved.

The polymer gel electrolytes used in the first to fifth preferred embodiments have ionic conductivity of $10^{-3}$ S/cm level.

The Sixth Preferred Embodiment

Figure 2:
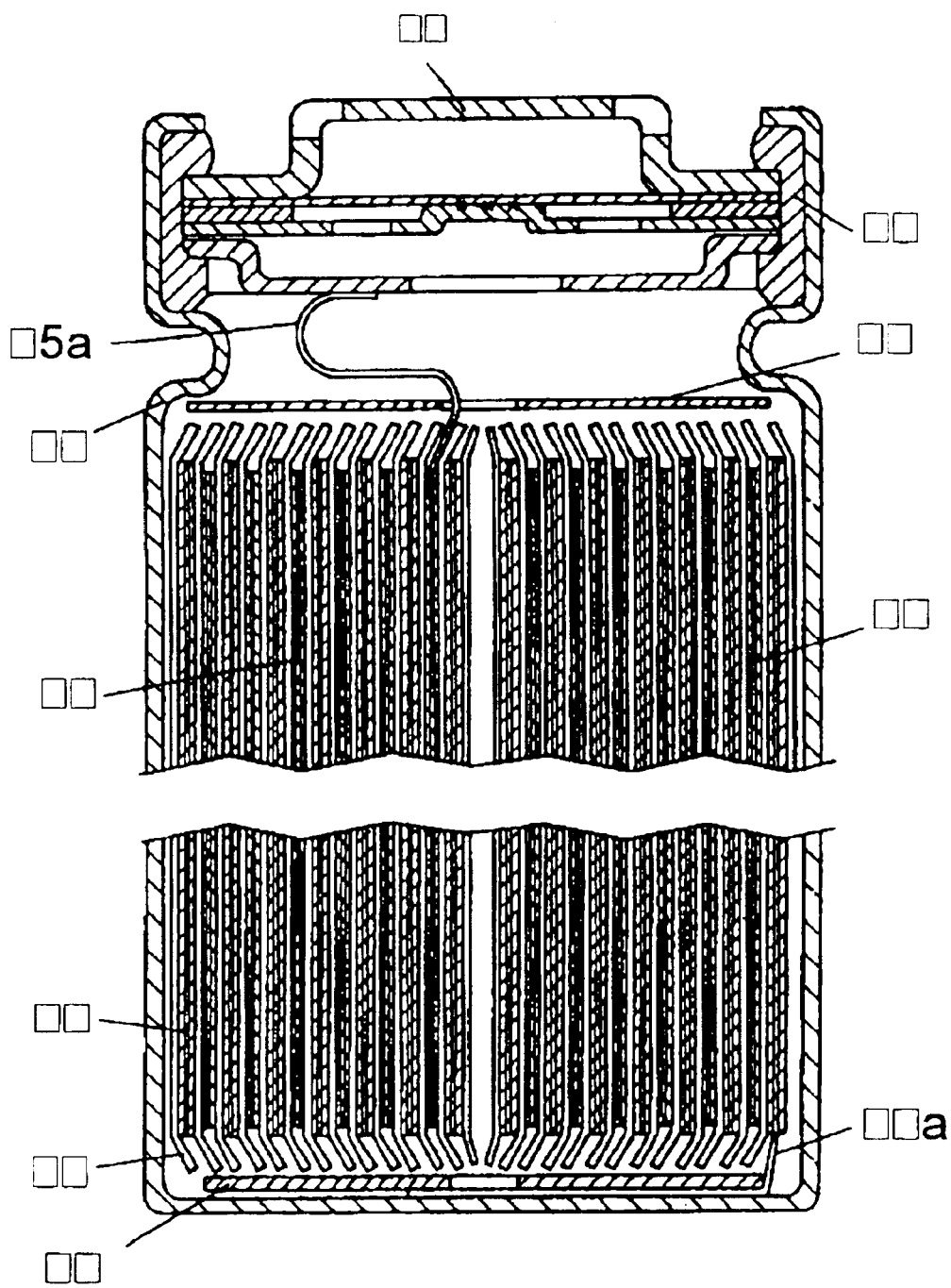
FIG. 2 shows vertical cross section of a cylindrical battery of the present invention.

FIG. 2 shows a vertical cross section of a cylindrical battery of the present invention. The positive electrode plate 15 and the negative electrode plate 16 are spirally rolled a plurality of times via the separator 17, and placed in the battery casing 11. Coming out from the positive electrode plate 15 is a positive electrode lead 15$a$, which is connected to a sealing plate 12. In the same manner, a negative electrode lead 16$a$ comes out from a negative electrode plate 16, and is connected to the bottom of the battery casing 11. Insulating gasket 13 separates sealing plate 12 from battery casing 11.

Electronically conductive metals and alloys having organic electrolytic solution resistance can be used for the battery casing and lead plates. For example, such metals as iron, nickel, titanium, chromium, molybdenum, copper and aluminum and their alloys can be used. For the battery casing, stainless steel plate or processed Al—Mn alloy plate, and for the positive electrode lead and the negative electrode lead, respectively aluminum and nickel are most preferably used. For the battery casing, engineering plastics can be used independently or with metals in order to reduce weight.

Insulating rings 18 are disposed on the top and the bottom of an electrode plate group 14. A safety valve can be used as a sealing plate. Apart from the safety valve, other conventionally used safety elements can be adopted. As an anti-overcurrent element, for example, fuses, bimetal and PTC elements can be used. To deal with increases in internal pressure of the battery casing, a cut can be provided to the battery casing, a gasket cracking method or a sealing plate cracking method can be applied, or the connection to the lead plate can be severed. As other methods, a protective circuit incorporating anti-overcharging and anti-overdischarging systems, can be included in or connected independently to a charger. As an anti-overcharging method, a system to cut off a current by utilizing an increase in internal pressure of the battery is used. In this case, a compound that raises internal pressure can be mixed with the composites or with the electrolytes. Such compounds include carbonates such as Li2CO3, LiHCO3, Na2CO3, NaHCO3, CaCO2 and MgCO3.

The cap, the battery casing, the sheet and the lead plate can be welded by well-known methods (such as an alternative current or a direct current electric welding, a laser welding and an ultrasonic welding). As a sealing material for the opening, conventional compounds and composites such as asphalt can be used.

A preferred embodiment wherein a cylindrical battery using solid electrolytes for separators is described below.

(A Manufacturing Method of the Solid Electrolytes and a Solid Electrolyte Sheet)

Lithium ion conductive glass-type solid electrolytes are manufactured in steps described below.

Lithium phosphate, lithium sulfide, and silicon disulfide are mixed at a molar ratio of 1:63:36, then put in a glassy carbon crucible and fused at 1000° C. for two hours in a dry nitrogen atmosphere. The fused fluid is quenched by a two-roller, and the resultant solid electrolytic glass is ground to form solid electrolyte powder. In the same manner, other solid electrolytes are synthesized with different combination of ingredients. The result is shown in Table 3. The ionic conductivity and the oxidative decomposition resistance voltage in the Table represent values measured respectively by the AC impedance method and the potential scanning method.

Subsequently, 2 wt % of PTFE is added to 98 wt % of the solid electrolyte powder and mixed thoroughly in a mortar to make it elastic. The elastic body is then pressed and rolled by a roller, and a solid electrolytic sheet is obtained.

(Negative Electrode Plate)

To prepare the negative electrode plate 6, 15 wt % of the solid electrolyte powder, 20 wt % of carbon powder and 5 wt % of PVDF are mixed with 60 wt % of the composite particles synthesized in the foregoing manner. The mixture is dispersed in dehydrated N-methyl pyrrolidinone to form a slurry. The slurry is coated onto a negative electrode current collector comprising copper foil, dried and rolled under pressure.

(Positive Electrode Plate)

To prepare the positive electrode plate 5, 15 wt % of the solid electrolytic powder, 10 wt % of carbon powder and 5 wt % of PVDF are mixed with 70 wt % of LiOCo$_2$ powder. The mixture is dispersed in dehydrated N-methyl pyrrolidinone to form a slurry. The slurry is coated onto a positive electrode current collector comprising aluminum foil, and dried and rolled under pressure.

In the foregoing manner, batteries are constructed by using the materials shown in Table 1 for the negative electrode and materials a-1 shown in Table 3 for the solid electrolytes. These cylindrical batteries are 18 mm in diameter and 65 mm in height. The batteries are charged with constant current of 100 mA until their voltage becomes 4.1V, and then discharged at the constant current of 100 mA until their voltage becomes 2.0V. The charge/discharge cycle is repeated 100 times, and ratio of the discharge capacity at the 100th cycle to that of the first cycle is shown in Table 4 as capacity retention rates.

Table 4 also shows capacity retention rates gained by comparing the initial capacity measured after the batteries of the same construction are charged with constant current of 100 mA until their voltage becomes 4.1V and discharged at the constant current of 100 mA until their voltage becomes 2.0V, and the capacity measured when the same batteries are charged again on the same condition until their voltage becomes 4.1V and stored for 60 days at 85° C. The capacity retention rate after the storing is a ratio of the discharge capacity after storing to the discharge capacity before storing.

For comparison, batteries using graphite or an Al—Li alloy for negative electrodes are prepared and tested.

To check whether the gas is produced after storing, a hole is made on the battery and gas is collected in a liquid paraffin. No gas is collected from any batteries. Thus, it can be concluded that none of the batteries of the present invention produced gas.

As Table 4 shows, the batteries of the present invention has a higher capacity, and superior cycle properties, high-rate charge/discharge properties and high-temperature storing properties compared with the batteries using conventional carbon materials and Al—Li alloys as negative electrode materials.

The composition of the solid electrolyte of this embodiment is not specifically defined on the condition that the resultant material is glassy, and has an ionic conductivity for lithium ions and the oxidative decomposition voltage of 5V or higher. The solid electrolytes of this embodiment is not specifically defined in terms of their composition.

The battery of the present invention can be applied in any form including coins, buttons, sheets, laminates, cylinders, flat types, square types and large types used in electric cars.

The battery of the present invention can be used for portable information terminals, portable electronic devices, small size domestic electricity storing devices, motor cycles, electric cars, and hybrid electric cars. However, the application of the battery is not limited to the foregoing.

Industry Applicability

The batteries using the non-aqueous electrolytes and the composite particles for the negative electrode of the present invention have a higher capacity and superior cycle properties, high-rate charge/discharge properties and high-temperature storage properties. As such, the batteries of the present invention can be used in portable information terminals, portable electronic devices, small size domestic electricity storing devices, motor cycles, electric cars and hybrid electric cars, thereby offering remarkable benefits when industrially applied.

TABLE 1

| Negative electrode material | Phase A | Phase B | Melting temperature (° C.) | Solid phase line temperature (° C.) | Composition (Atom %) |
|---|---|---|---|---|---|
| Material A | Sn | $Mg_2Sn$ | 770 | 204 | Sn:Mg = 50:50 |
| Material B | Sn | $FeSn_2$ | 1540 | 513 | Sn:Fe = 70:30 |
| Material C | Sn | $MoSn_2$ | 1200 | 800 | Sn:Mo = 70:30 |
| Material D | Sn | Zn, Sn Solid S. | 420 | 199 | Sn:Zn = 90:10 |
| Material E | Sn | Cd, Sn Solid S. | 232 | 133 | Sn:Cd = 95:5 |
| Material F | Sn | In, Sn Solid S. | 235 | 224 | Sn:In = 98:2 |
| Material G | Sn | Sn, Pb Solid S. | 232 | 183 | Sn:Pb = 80:20 |
| Material H | Si | $Mg_2Si$ | 1415 | 946 | Si:Mg = 70:30 |
| Material I | Si | $CoSi_2$ | 1495 | 1259 | Si:Co = 85:15 |
| Material J | Si | $NiSi_2$ | 1415 | 993 | Si:Ni = 69:31 |
| Material K | Si | Si, Zn Solid S. | 1415 | 420 | Si:Zn = 50:50 |
| Material L | Si | Si, Al Solid S. | 1415 | 577 | Si:Al = 40:60 |
| Material M | Si | Si, Sn Solid S. | 1415 | 232 | Si:Sn = 50:50 |
| Material N | Zn | $Mg_2Zn_{11}$ | 650 | 364 | Zn:Mg = 92.9:7.8 |
| Material O | Zn | Zn, Cu Solid S. | 1085 | 425 | Zn:Cu = 97:3 |
| Material P | Zn | $VZn_{11}$ | 700 | 420 | Zn:V = 94:6 |
| Material Q | Zn | Zn, Cd Solid S. | 420 | 266 | Zn:Cd = 50:50 |
| Material R | Zn | Zn, Al Solid S. | 661 | 381 | Zn:Al = 90:10 |
| Material S | Zn | Zn, Ge Solid S. | 938 | 394 | Zn:Ge = 97:3 |

TABLE 2

| Example | | Negative electrode materials | Initial Discharge Capacity (mAh) | 100th Discharge Capacity (mAh) | capacity retention rate (%) |
|---|---|---|---|---|---|
| Example 1 | 1 | Material A | 148 | 133 | 90 |
| | 2 | B | 147 | 131 | 89 |
| | 3 | C | 146 | 128 | 88 |
| | 4 | D | 146 | 131 | 90 |
| | 5 | E | 148 | 135 | 91 |
| | 6 | F | 147 | 134 | 91 |
| | 7 | G | 148 | 133 | 90 |
| | 8 | H | 150 | 135 | 90 |
| | 9 | I | 149 | 133 | 89 |
| | 10 | J | 152 | 138 | 91 |
| | 11 | K | 151 | 136 | 90 |
| | 12 | L | 153 | 135 | 88 |
| | 13 | M | 152 | 137 | 90 |
| | 14 | N | 149 | 136 | 91 |
| | 15 | O | 150 | 135 | 90 |
| | 16 | P | 146 | 130 | 89 |
| | 17 | Q | 147 | 132 | 90 |
| | 18 | R | 150 | 135 | 90 |
| | 19 | S | 147 | 131 | 89 |

TABLE 2-continued

| Example | | Negative electrode materials | Initial Discharge Capacity (mAh) | 100th Discharge Capacity (mAh) | capacity retention rate (%) |
|---|---|---|---|---|---|
| Example 2 | 1 | Material A | 150 | 135 | 90 |
| | 2 | J | 153 | 138 | 90 |
| | 3 | N | 150 | 137 | 91 |
| Example 3 | 1 | Material A | 147 | 131 | 89 |
| | 2 | J | 151 | 136 | 90 |
| | 3 | N | 152 | 135 | 89 |
| Example 4 | 1 | Material A | 147 | 132 | 90 |
| | 2 | J | 148 | 133 | 90 |
| | 3 | N | 146 | 131 | 90 |
| Example 5 | 1 | Material A | 148 | 133 | 90 |
| | 2 | J | 150 | 135 | 90 |
| | 3 | N | 151 | 136 | 90 |
| Comparative Example PEO | | Graphite | 116 | 107 | 92 |

TABLE 3

| Solid Electrolyte | Composition | Ion conductivity mS/cm | Oxidative Decomposition Voltage V vs Li$^+$/Li |
|---|---|---|---|
| a | 0.01 Li$_3$PO$_4$/0.63 Li$_2$S/0.36 SiS$_2$ | 1.8 | 10 |
| b | 0.02 Li$_2$SO$_4$/0.63 Li$_2$S/0.35 SiS$_2$ | 1.6 | 9.5 |
| c | 0.01 Li$_3$BO$_3$/0.63 Li$_2$S/0.36 SiS$_2$ | 1.5 | 10 |
| d | 0.01 Li$_4$SiO$_4$/0.63 Li$_2$S/0.36 SiS$_2$ | 1.3 | 9.0 |
| e | 0.01 Li$_3$PO$_4$/0.63 Li$_2$S/0.36 P$_2$S$_5$ | 1.6 | 10 |
| f | 0.02 Li$_2$SO$_4$/0.63 Li$_2$S/0.35 P$_2$S$_5$ | 1.4 | 9.7 |
| g | 0.01 Li$_3$BO$_3$/0.63 Li$_2$S/0.36 P$_2$S$_5$ | 1.1 | 10 |
| h | 0.01 Li$_4$SiO$_4$/0.63 Li$_2$S/0.36 P$_2$S$_5$ | 1.0 | 9.3 |
| i | 0.01 Li$_3$PO$_4$/0.63 Li$_2$S/0.36 B$_2$S$_3$ | 1.7 | 10 |
| j | 0.02 Li$_2$SO$_4$/0.63 Li$_2$S/0.35 B$_2$S$_3$ | 1.5 | 9.3 |
| k | 0.01 Li$_3$BO$_3$/0.63 Li$_2$S/0.36 B$_2$S$_3$ | 1.3 | 9.9 |
| l | 0.01 Li$_4$SiO$_4$/0.63 Li$_2$S/0.36 B$_2$S$_3$ | 1.2 | 9.1 |

TABLE 4

| Battery | Solid electrolyte | Negative Electrode Material | Initial Discharge Capacity (mAh) | 100th Discharge Capacity (mAh) | Cycle capacity retention rate (%) | Capacity retention rate (%) |
|---|---|---|---|---|---|---|
| 1 | a | Material A | 1498 | 1495 | 99.8 | 99.9 |
| 2 | | B | 1491 | 1488 | 99.8 | 99.9 |
| 3 | | C | 1478 | 1477 | 99.9 | 99.9 |
| 4 | | D | 1482 | 1482 | 100 | 100 |
| 5 | | E | 1500 | 1497 | 99.8 | 99.9 |
| 6 | | F | 1489 | 1485 | 99.7 | 99.8 |
| 7 | | G | 1497 | 1494 | 99.8 | 100 |
| 8 | | H | 1565 | 1560 | 99.7 | 100 |
| 9 | | I | 1552 | 1551 | 99.9 | 100 |
| 10 | | J | 1579 | 1577 | 99.9 | 99.9 |
| 11 | | K | 1575 | 1571 | 99.7 | 99.9 |
| 12 | | L | 1591 | 1588 | 99.8 | 100 |
| 13 | | M | 1591 | 1589 | 99.9 | 100 |
| 14 | | N | 1551 | 1549 | 99.9 | 100 |
| 15 | | O | 1556 | 1556 | 100 | 99.9 |
| 16 | | P | 1521 | 1520 | 99.9 | 100 |
| 17 | | Q | 1528 | 1527 | 99.9 | 100 |
| 18 | | R | 1559 | 1557 | 99.9 | 99.9 |
| 19 | | S | 1526 | 1524 | 99.9 | 100 |
| Comparative | a | Graphite | 1208 | 1204 | 99.7 | 99.9 |
| | | Al—Li alloy | 1493 | 704 | 47.2 | 99.2 |
| 1 | b | Material A | 1496 | 1492 | 99.7 | 99.5 |
| 2 | | B | 1488 | 1485 | 99.8 | 99.7 |
| 3 | | C | 1476 | 1472 | 99.7 | 99.8 |
| 4 | | D | 1482 | 1481 | 99.9 | 99.4 |
| 5 | | E | 1497 | 1497 | 100 | 99.3 |
| 6 | | F | 1488 | 1485 | 99.8 | 99.7 |
| 7 | | G | 1492 | 1488 | 99.6 | 99.6 |
| 8 | | H | 1561 | 1559 | 99.9 | 98.9 |
| 9 | | I | 1550 | 1550 | 100 | 99.9 |
| 10 | | J | 1574 | 1571 | 99.8 | 99.2 |
| 11 | | K | 1575 | 1570 | 99.7 | 99.3 |
| 12 | | L | 1588 | 1585 | 99.8 | 99.4 |
| 13 | | M | 1589 | 1589 | 100 | 99.9 |
| 14 | | N | 1548 | 1546 | 99.9 | 99.3 |
| 15 | | O | 1550 | 1545 | 99.7 | 99.4 |
| 16 | | P | 1516 | 1507 | 99.4 | 99.6 |
| 17 | | Q | 1523 | 1508 | 99.0 | 99.2 |
| 18 | | R | 1555 | 1547 | 99.5 | 99.1 |
| 19 | | S | 1521 | 1509 | 99.2 | 98.8 |

TABLE 4-continued

| Battery | Solid electrolyte | Negative Electrode Material | Initial Discharge Capacity (mAh) | 100th Discharge Capacity (mAh) | Cycle capacity retention rate (%) | Capacity retention rate (%) |
|---|---|---|---|---|---|---|
| comparative | b | Graphite | 1202 | 1198 | 99.7 | 98.9 |
|  |  | Al—Li alloy | 1489 | 689 | 46.3 | 99.0 |
| 1 | c | Material A | 1487 | 1480 | 99.5 | 99.0 |
| 2 |  | B | 1480 | 1479 | 99.9 | 98.9 |
| 3 |  | C | 1467 | 1460 | 99.5 | 98.8 |
| 4 |  | D | 1471 | 1459 | 99.2 | 98.2 |
| 5 |  | E | 1489 | 1477 | 99.2 | 99.3 |
| 6 |  | F | 1478 | 1462 | 98.9 | 98.9 |
| 7 |  | G | 1486 | 1470 | 98.9 | 99.1 |
| 8 |  | H | 1554 | 1542 | 99.2 | 99.3 |
| 9 |  | I | 1541 | 1530 | 99.3 | 100 |
| 10 |  | J | 1568 | 1563 | 99.7 | 99.7 |
| 11 |  | K | 1564 | 1560 | 99.7 | 99.3 |
| 12 |  | L | 1580 | 1577 | 99.8 | 99.0 |
| 13 |  | M | 1579 | 1571 | 99.5 | 98.8 |
| 14 |  | N | 1540 | 1532 | 99.5 | 98.7 |
| 15 |  | O | 1545 | 1534 | 99.3 | 98.9 |
| 16 |  | P | 1510 | 1501 | 99.4 | 99.1 |
| 17 |  | Q | 1517 | 1512 | 99.7 | 99.3 |
| 18 |  | R | 1548 | 1540 | 99.5 | 99.2 |
| 19 |  | S | 1515 | 1505 | 99.3 | 99.4 |
| comparative | c | Graphite | 1197 | 1190 | 99.4 | 99.7 |
|  |  | Al—Li alloy | 1482 | 682 | 46.0 | 99.3 |
| 1 | d | Material A | 1494 | 1485 | 99.4 | 99.3 |
| 2 |  | B | 1487 | 1480 | 99.5 | 99.1 |
| 3 |  | C | 1474 | 1465 | 99.4 | 99.6 |
| 4 |  | D | 1478 | 1469 | 99.4 | 99.7 |
| 5 |  | E | 1496 | 1485 | 99.3 | 98.8 |
| 6 |  | F | 1485 | 1472 | 99.1 | 99.4 |
| 7 |  | G | 1493 | 1480 | 99.1 | 100 |
| 8 |  | H | 1561 | 1549 | 99.2 | 99.9 |
| 9 |  | I | 1548 | 1535 | 99.2 | 99.8 |
| 10 |  | J | 1575 | 1560 | 99.0 | 99.3 |
| 11 |  | K | 1570 | 1557 | 99.2 | 99.1 |
| 12 |  | L | 1587 | 1569 | 98.9 | 99.4 |
| 13 |  | M | 1586 | 1571 | 99.1 | 98.7 |
| 14 |  | N | 1547 | 1530 | 98.9 | 98.9 |
| 15 |  | O | 1552 | 1539 | 99.2 | 99.3 |
| 16 |  | P | 1517 | 1501 | 98.9 | 98.9 |
| 17 |  | Q | 1524 | 1511 | 99.1 | 100 |
| 18 |  | R | 1555 | 1542 | 99.2 | 99.4 |
| 19 |  | S | 1522 | 1508 | 99.1 | 99.7 |
| comparative | d | Graphite | 1204 | 1197 | 99.4 | 99.2 |
|  |  | Al—Li alloy | 1489 | 673 | 45.2 | 99.3 |
| 1 | e | Material A | 1492 | 1477 | 99.0 | 98.9 |
| 2 |  | B | 1485 | 1469 | 98.8 | 98.4 |
| 3 |  | C | 1472 | 1455 | 98.8 | 98.6 |
| 4 |  | D | 1476 | 1457 | 98.7 | 98.4 |
| 5 |  | E | 1494 | 1480 | 99.1 | 99.4 |
| 6 |  | F | 1483 | 1467 | 98.9 | 99.1 |
| 7 |  | G | 1491 | 1475 | 98.9 | 98.6 |
| 8 |  | H | 1559 | 1442 | 98.9 | 98.5 |
| 9 |  | I | 1546 | 1530 | 99.0 | 98.4 |
| 10 |  | J | 1573 | 1559 | 99.1 | 98.7 |
| 11 |  | K | 1569 | 1553 | 99.0 | 99.8 |
| 12 |  | L | 1585 | 1569 | 99.0 | 100 |
| 13 |  | M | 1584 | 1572 | 99.2 | 99.3 |
| 14 |  | N | 1545 | 1529 | 99.0 | 98.7 |
| 15 |  | O | 1550 | 1538 | 99.2 | 98.6 |
| 16 |  | P | 1515 | 1500 | 99.0 | 99.2 |
| 17 |  | Q | 1522 | 1510 | 99.2 | 98.9 |
| 18 |  | R | 1553 | 1541 | 99.2 | 98.5 |
| 19 |  | S | 1520 | 1503 | 98.9 | 98.8 |
| comparative | e | Graphite | 1202 | 1189 | 98.9 | 98.7 |
|  |  | Al—Li alloy | 1487 | 669 | 45.0 | 99.7 |
| 1 | f | Material A | 1490 | 1480 | 99.3 | 100 |
| 2 |  | B | 1483 | 1472 | 99.3 | 99.9 |
| 3 |  | C | 1470 | 1457 | 99.1 | 98.9 |
| 4 |  | D | 1474 | 1460 | 99.1 | 99.3 |
| 5 |  | E | 1492 | 1479 | 99.1 | 99.4 |
| 6 |  | F | 1481 | 1466 | 99.0 | 100 |
| 7 |  | G | 1489 | 1472 | 98.9 | 99.3 |
| 8 |  | H | 1557 | 1542 | 99.0 | 99.2 |

TABLE 4-continued

| Battery | Solid electrolyte | Negative Electrode Material | Initial Discharge Capacity (mAh) | 100th Discharge Capacity (mAh) | Cycle capacity retention rate (%) | Capacity retention rate (%) |
|---|---|---|---|---|---|---|
| 9 | | I | 1544 | 1530 | 99.1 | 98.8 |
| 10 | | J | 1571 | 1554 | 98.9 | 98.7 |
| 11 | | K | 1566 | 1549 | 98.9 | 99.0 |
| 12 | | L | 1583 | 1560 | 98.5 | 100 |
| 13 | | M | 1582 | 1568 | 99.1 | 99.3 |
| 14 | | N | 1543 | 1530 | 99.2 | 98.7 |
| 15 | | O | 1548 | 1532 | 99.0 | 98.3 |
| 16 | | P | 1513 | 1497 | 98.9 | 98.1 |
| 17 | | Q | 1520 | 1500 | 98.7 | 98.4 |
| 18 | | R | 1551 | 1535 | 99.0 | 99.2 |
| 19 | | S | 1518 | 1499 | 98.7 | 99.3 |
| comparative | f | Graphite | 1200 | 1185 | 98.9 | 98.1 |
| | | Al—Li alloy | 1485 | 697 | 46.9 | 97.8 |
| 1 | g | Material A | 1489 | 1477 | 99.2 | 99.6 |
| 2 | | B | 1482 | 1469 | 99.1 | 99.1 |
| 3 | | C | 1468 | 1452 | 98.9 | 99.3 |
| 4 | | D | 1472 | 1460 | 99.2 | 98.4 |
| 5 | | E | 1490 | 1478 | 99.2 | 98.9 |
| 6 | | F | 1480 | 1466 | 99.1 | 99.2 |
| 7 | | G | 1487 | 1470 | 98.9 | 99.4 |
| 8 | | H | 1555 | 1541 | 99.1 | 98.7 |
| 9 | | I | 1543 | 1529 | 99.1 | 98.9 |
| 10 | | J | 1569 | 1550 | 98.8 | 99.0 |
| 11 | | K | 1564 | 1549 | 99.0 | 99.1 |
| 12 | | L | 1581 | 1570 | 99.3 | 99.4 |
| 13 | | M | 1580 | 1567 | 99.2 | 99.2 |
| 14 | | N | 1542 | 1530 | 99.2 | 100 |
| 15 | | O | 1517 | 1500 | 98.9 | 99.1 |
| 16 | | P | 1510 | 1497 | 99.1 | 99.7 |
| 17 | | Q | 1518 | 1502 | 98.9 | 98.3 |
| 18 | | R | 1549 | 1530 | 98.9 | 98.8 |
| 19 | | S | 1517 | 1499 | 98.8 | 99.0 |
| comparative | g | Graphite | 1198 | 1180 | 98.5 | 99.8 |
| | | Al—Li alloy | 1482 | 677 | 45.7 | 99.3 |
| 1 | h | Material A | 1495 | 1479 | 98.9 | 99.1 |
| 2 | | B | 1490 | 1477 | 99.1 | 99.2 |
| 3 | | C | 1472 | 1451 | 98.6 | 98.3 |
| 4 | | D | 1479 | 1468 | 99.3 | 99.3 |
| 5 | | E | 1496 | 1481 | 99.0 | 98.9 |
| 6 | | F | 1486 | 1472 | 99.1 | 99.2 |
| 7 | | G | 1493 | 1472 | 98.6 | 98.6 |
| 8 | | H | 1561 | 1540 | 98.7 | 98.4 |
| 9 | | I | 1549 | 1530 | 98.8 | 98.7 |
| 10 | | J | 1575 | 1557 | 98.9 | 99.0 |
| 11 | | K | 1569 | 1550 | 98.8 | 99.3 |
| 12 | | L | 1587 | 1570 | 98.9 | 99.4 |
| 13 | | M | 1586 | 1569 | 98.9 | 99.2 |
| 14 | | N | 1548 | 1540 | 99.5 | 99.0 |
| 15 | | O | 1522 | 1502 | 98.7 | 98.8 |
| 16 | | P | 1516 | 1500 | 98.9 | 99.1 |
| 17 | | Q | 1524 | 1509 | 99.0 | 99.3 |
| 18 | | R | 1555 | 1538 | 98.9 | 99.0 |
| 19 | | S | 1524 | 1509 | 99.0 | 98.7 |
| comparative | h | Graphite | 1207 | 1188 | 98.4 | 99.2 |
| | | Al—Li alloy | 1490 | 714 | 47.9 | 98.9 |
| 1 | i | Material A | 1501 | 1498 | 99.8 | 99.7 |
| 2 | | B | 1496 | 1494 | 99.9 | 99.6 |
| 3 | | C | 1478 | 1470 | 99.5 | 99.2 |
| 4 | | D | 1484 | 1477 | 99.5 | 99.0 |
| 5 | | E | 1501 | 1490 | 99.3 | 99.4 |
| 6 | | F | 1492 | 1479 | 99.1 | 98.7 |
| 7 | | G | 1499 | 1479 | 98.7 | 98.8 |
| 8 | | H | 1567 | 1561 | 99.6 | 99.1 |
| 9 | | I | 1547 | 1529 | 98.8 | 99.0 |
| 10 | | J | 1580 | 1561 | 98.9 | 99.2 |
| 11 | | K | 1567 | 1561 | 99.0 | 99.4 |
| 12 | | L | 1592 | 1570 | 98.6 | 98.9 |
| 13 | | M | 1591 | 1571 | 98.7 | 98.9 |
| 14 | | N | 1553 | 1547 | 99.6 | 99.1 |
| 15 | | O | 1529 | 1502 | 98.2 | 99.1 |
| 16 | | P | 1523 | 1505 | 98.8 | 99.2 |
| 17 | | Q | 1530 | 1510 | 98.7 | 98.9 |

TABLE 4-continued

| Battery | Solid electrolyte | Negative Electrode Material | Initial Discharge Capacity (mAh) | 100th Discharge Capacity (mAh) | Cycle capacity retention rate (%) | Capacity retention rate (%) |
|---|---|---|---|---|---|---|
| 18 | | R | 1562 | 1547 | 99.0 | 98.3 |
| 19 | | S | 1531 | 1511 | 98.7 | 98.4 |
| comparative | i | Graphite | 1212 | 1199 | 98.9 | 99.2 |
| | | Al—Li alloy | 1496 | 721 | 48.2 | 99.5 |
| 1 | j | Material A | 1499 | 1482 | 98.9 | 98.8 |
| 2 | | B | 1494 | 1477 | 98.9 | 99.1 |
| 3 | | C | 1477 | 1462 | 99.0 | 99.2 |
| 4 | | D | 1483 | 1466 | 98.9 | 98.7 |
| 5 | | E | 1499 | 1482 | 98.9 | 98.6 |
| 6 | | F | 1490 | 1473 | 98.9 | 99.3 |
| 7 | | G | 1496 | 1478 | 98.9 | 99.5 |
| 8 | | H | 1565 | 1548 | 98.9 | 98.4 |
| 9 | | I | 1545 | 1532 | 99.2 | 98.8 |
| 10 | | J | 1578 | 1560 | 98.9 | 98.3 |
| 11 | | K | 1573 | 1557 | 98.9 | 99.1 |
| 12 | | L | 1589 | 1570 | 98.8 | 99.0 |
| 13 | | M | 1588 | 1569 | 98.8 | 98.4 |
| 14 | | N | 1550 | 1528 | 98.6 | 98.7 |
| 15 | | O | 1527 | 1508 | 98.8 | 99.0 |
| 16 | | P | 1519 | 1501 | 98.8 | 99.3 |
| 17 | | Q | 1526 | 1512 | 99.1 | 99.1 |
| 18 | | R | 1559 | 1540 | 98.8 | 98.6 |
| 19 | | S | 1528 | 1511 | 98.9 | 98.7 |
| comparative | j | Graphite | 1209 | 1191 | 98.5 | 98.9 |
| | | Al—Li alloy | 1492 | 703 | 47.1 | 98.9 |
| 1 | k | Material A | 1493 | 1473 | 98.7 | 98.9 |
| 2 | | B | 1488 | 1467 | 98.6 | 99.1 |
| 3 | | C | 1471 | 1453 | 98.8 | 99.3 |
| 4 | | D | 1477 | 1456 | 98.6 | 98.8 |
| 5 | | E | 1493 | 1472 | 98.6 | 98.8 |
| 6 | | F | 1484 | 1465 | 98.7 | 98.6 |
| 7 | | G | 1489 | 1466 | 98.5 | 98.9 |
| 8 | | H | 1558 | 1539 | 98.8 | 98.7 |
| 9 | | I | 1540 | 1520 | 98.7 | 99.0 |
| 10 | | J | 1571 | 1553 | 98.9 | 98.8 |
| 11 | | K | 1567 | 1545 | 98.6 | 98.5 |
| 12 | | L | 1582 | 1561 | 98.7 | 98.5 |
| 13 | | M | 1581 | 1560 | 98.7 | 98.7 |
| 14 | | N | 1541 | 1519 | 98.6 | 98.7 |
| 15 | | O | 1520 | 1499 | 98.6 | 99.3 |
| 16 | | P | 1512 | 1493 | 98.7 | 99.7 |
| 17 | | Q | 1522 | 1503 | 98.8 | 99.4 |
| 18 | | R | 1551 | 1531 | 98.7 | 98.0 |
| 19 | | S | 1519 | 1500 | 98.7 | 98.2 |
| comparative | k | Graphite | 1202 | 1183 | 98.4 | 99.1 |
| | | Al—Li alloy | 1485 | 689 | 46.4 | 99.2 |
| 1 | l | Material A | 1491 | 1472 | 98.7 | 99.4 |
| 2 | | B | 1486 | 1460 | 98.3 | 99.0 |
| 3 | | C | 1469 | 1443 | 98.2 | 98.9 |
| 4 | | D | 1475 | 1452 | 98.4 | 98.5 |
| 5 | | E | 1490 | 1468 | 98.5 | 98.7 |
| 6 | | F | 1482 | 1460 | 98.5 | 98.9 |
| 7 | | G | 1487 | 1462 | 98.3 | 99.1 |
| 8 | | H | 1557 | 1535 | 98.6 | 99.4 |
| 9 | | I | 1537 | 1511 | 98.3 | 99.2 |
| 10 | | J | 1568 | 1546 | 98.6 | 98.3 |
| 11 | | K | 1565 | 1537 | 98.2 | 98.7 |
| 12 | | L | 1579 | 1563 | 99.0 | 99.1 |
| 13 | | M | 1579 | 1561 | 98.9 | 99.3 |
| 14 | | N | 1538 | 1508 | 98.0 | 98.1 |
| 15 | | O | 1516 | 1495 | 98.6 | 98.2 |
| 16 | | P | 1510 | 1491 | 98.7 | 98.6 |
| 17 | | Q | 1519 | 1500 | 98.7 | 99.4 |
| 18 | | R | 1548 | 1525 | 98.5 | 99.1 |
| 19 | | S | 1516 | 1495 | 98.6 | 99.2 |
| comparative | | Graphite | 1197 | 1179 | 98.5 | 98.9 |
| | | Al—Li alloy | 1480 | 666 | 45.0 | 98.7 |

What is claimed is:

1. A non-aqueous electrolyte secondary battery comprising:
   a positive electrode,
   a negative electrode capable of intercalating and de-intercalating lithium,
   a non-aqueous electrolyte solution, and
   a polymer gel electrolyte, said polymer gel electrolyte comprising a polymer,
   wherein:
   said negative electrode comprises a plurality of composite particles,
   each of said composite particles comprises: a central portion consisting essentially of at least one element selected from the group consisting of tin, silicon, and zinc; and a coating at least partially around said central portion,
   said coating comprises a solid solution or an inter-metallic compound, and
   said solid solution or inter-metallic compound comprises:
   a) at least one element selected from the group consisting of tin, silicon, and zinc, and b) at least one additional element, said additional element selected from the group consisting of group 2 elements, transition elements, group 12 elements, group 13 elements and group 14 elements exclusive of carbon, and exclusive of said element selected from the group consisting of tin, silicon, and zinc in said solid solution or inter-metallic compound.

2. The non-aqueous electrolyte secondary battery of claim 1, wherein said positive electrode comprises a lithium-containing composite oxide and said polymer, and said negative electrode comprises said composite particles and said polymer.

3. The non-aqueous electrolyte secondary battery of claim 1 or claim 2, wherein said polymer is a polyalkylene oxide.

4. The non-aqueous electrolyte secondary battery of claim 1 or claim 2, wherein said polymer is a polymer or a copolymer comprising at least one monomer selected from the group consisting of acrylonitrile, vinylidene fluoride, hexafluoro-propylene, tetrafluoro-ethylene, and perfluoroalkyl vinyl ether.

5. The non-aqueous electrolyte secondary battery of claim 1 or claim 2, wherein said polymer is a polyester.

6. The non-aqueous electrolyte secondary battery of claim 1 or claim 2, wherein said polymer is a copolymer of a methacrylate and an ethylene oxide.

7. The non-aqueous electrolyte secondary battery of claim 1 or claim 2, wherein said polymer gel electrolyte comprises at least one structural reinforcement selected from the group consisting of hydrophobic treated particulates, fiber fabrics of polyolefin polymers, and non-woven fabrics of polyolefin polymers.

8. The non-aqueous electrolyte secondary battery of claim 1 or claim 2, wherein said at least one element selected from the group consisting of tin, silicon, and zinc in said central portion is zinc, and said at least one element selected from the group consisting of tin, silicon, and zinc in said solid solution or inter-metallic compound is zinc.

9. The non-aqueous electrolyte secondary battery of claim 1 or claim 2, wherein said additional element selected from the group consisting of group 2 elements, transition elements, group 12 elements, group 13 elements and group 14 elements exclusive of carbon, and exclusive of said element selected from the group consisting of tin, silicon, and zinc, is selected from the group consisting of Mg, Fe, Mo, Cd, In, Pb, Co, Ni, Al, Cu, V, and Ge.

10. The non-aqueous electrolyte secondary battery of claim 1 or claim 2, wherein said at least one element selected from the group consisting of tin, silicon, and zinc in said central portion is tin, and said at least one element selected from the group consisting of tin, silicon, and zinc in said solid solution or inter-metallic compound is tin.

11. The non-aqueous electrolyte secondary battery of claim 1 or claim 2, wherein said at least one element selected from the group consisting of tin, silicon, and zinc in said central portion is silicon, and said at least one element selected from the group consisting of tin, silicon, and zinc in said solid solution or inter-metallic compound is silicon.

12. A non-aqueous electrolyte secondary battery comprising:
   a positive electrode,
   a negative electrode capable of intercalating and de-intercalating lithium,
   a non-aqueous electrolyte solution, and
   a lithium ion conductive glass solid electrolyte,
   wherein:
   said negative electrode comprises a plurality of composite particles,
   each of said composite particles comprises: a central portion consisting essentially of at least one element selected from the group consisting of tin, silicon, and zinc; and a coating at least partially around said central portion,
   said coating comprises at least one of a solid solution and an inter-metallic compound, and
   said solid solution or inter-metallic compound comprises:
   a) at least one element selected from the group consisting of tin, silicon, and zinc, and b) at least one additional element, said additional element selected from the group consisting of group 2 elements, transition elements, group 12 elements, group 13 elements and group 14 elements exclusive of carbon, and exclusive of said element selected from the group consisting of tin, silicon, and zinc in said solid solution or inter-metallic compound.

13. The non-aqueous electrolyte secondary battery of claim 12, wherein said lithium ion conductive glass solid electrolyte is synthesized from:
   a first component comprising a lithium sulfide;
   a second component comprising a silicon sulfide, a phosphor sulfide or a boron sulfide; and
   a third component comprising lithium phosphate, lithium sulfate, lithium borate, or lithium silicate.

14. The non-aqueous electrolyte secondary battery of claim 12, wherein said at least one element selected from the group consisting of tin, silicon, and zinc in said central portion is silicon, and said at least one element selected from the group consisting of tin, silicon, and zinc in said solid solution or inter-metallic compound is silicon.

15. The non-aqueous electrolyte secondary battery of claim 12, wherein said additional element selected from the group consisting of group 2 elements, transition elements, group 12 elements, group 13 elements and group 14 elements exclusive of carbon, and exclusive of said element selected from the group consisting of tin, silicon, and zinc, is selected from the group consisting of Mg, Fe, Mo, Cd, In, Pb, Co, Ni, Al, Cu, V, and Ge.

16. A non-aqueous electrolyte secondary battery comprising:
   a positive electrode,
   a negative electrode capable of intercalating and de-intercalating lithium, a non-aqueous electrolyte solution; and
an electrolyte,
wherein:
said negative electrode comprises a plurality of composite particles,
each of said composite particles comprises a central portion comprising silicon, and a coating at least partially around said central portion,
said coating comprises a solid solution or an inter-metallic compound, and
said solid solution or inter-metallic compound comprises: a) silicon, and b) at least one additional element, said additional element selected from the group consisting of group 2 elements, transition elements, group 12 elements, group 13 elements, and group 14 elements exclusive of carbon and silicon; and
said electrolyte is a polymer gel electrolyte comprising a polymer, or a lithium ion conductive glass solid electrolyte.

17. The non-aqueous electrolyte secondary battery of claim 16, wherein said electrolyte is said polymer gel electrolyte, said positive electrode comprises a lithium-containing composite oxide and said polymer in said polymer gel electrolyte, and said negative electrode comprises said composite particles and said polymer.

18. The non-aqueous electrolyte secondary battery of claim 16 or claim 17, wherein said electrolyte is said polymer gel electrolyte and said polymer in said polymer gel electrolyte is a polyester.

19. The non-aqueous electrolyte secondary battery of claim 16 or claim 17, wherein said electrolyte is said polymer gel electrolyte and said polymer in said polymer gel electrolyte is a copolymer of a methacrylate and an ethylene oxide.

20. The non-aqueous electrolyte secondary battery of claim 16 or claim 17, wherein said electrolyte is said polymer gel electrolyte and said polymer gel electrolyte comprises at least one structural reinforcement selected from the group consisting of hydrophobic treated particulates, fiber fabrics of polyolefin polymers, and non-woven fabrics of polyolefin polymers.

21. The non-aqueous electrolyte secondary battery of claim 16 or claim 17, wherein said additional element selected from the group consisting of group 2 elements, transition elements, group 12 elements, group 13 elements, and group 14 elements exclusive of carbon and silicon is selected from the group consisting of Mg, Co, Ni, Zn, Al, and Sn.

22. The non-aqueous electrolyte secondary battery of claim 16 or claim 17, wherein said electrolyte is said polymer gel electrolyte and said polymer in said polymer gel electrolyte is a polymer or a copolymer comprising at least one monomer selected from the group consisting of acrylonitrile, vinylidene fluoride, hexafluoro-propylene, tetrafluoro-ethylene, and perfluoro-alkyl vinyl ether.

23. The non-aqueous electrolyte secondary battery of claim 16 or claim 17, wherein said central portion consists essentially of silicon.

24. The non-aqueous electrolyte secondary battery of claim 23, wherein said additional element selected from the group consisting of group 2 elements, transition elements, group 12 elements, group 13 elements, and group 14 elements exclusive of carbon and silicon is selected from the group consisting of Mg, Co, Ni, Zn, Al, and Sn.

25. The non-aqueous electrolyte secondary battery of claim 23, wherein said polymer is a polyalkylene oxide.

26. The non-aqueous electrolyte secondary battery of claim 23, wherein said electrolyte is said polymer gel electrolyte and said polymer in said polymer gel electrolyte is a polymer or a copolymer comprising at least one monomer selected from the group consisting of acrylonitrile, vinylidene fluoride, hexafluoro-propylene, tetrafluoro-ethylene, and perfluoro-alkyl vinyl ether.

27. The non-aqueous electrolyte secondary battery of claim 23, wherein said electrolyte is said polymer gel electrolyte and said polymer in said polymer gel electrolyte is a polyester.

28. The non-aqueous electrolyte secondary battery of claim 23, wherein said electrolyte is said polymer gel electrolyte and said polymer in said polymer gel electrolyte is a copolymer of a methacrylate and an ethylene oxide.

29. The non-aqueous electrolyte secondary battery of claim 23, wherein said electrolyte is said polymer gel electrolyte and said polymer gel electrolyte comprises at least one structural reinforcement selected from the group consisting of hydrophobic treated particulates, fiber fabrics of polyolefin polymers, and non-woven fabrics of polyolefin polymers.

30. The non-aqueous electrolyte secondary battery of claim 14 or claim 15, wherein said electrolyte is said polymer gel electrolyte and said polymer in said polymer gel electrolyte is a polyalkylene oxide.

* * * * *

UNITED STATES PATENT AND TRADEMARK OFFICE
CERTIFICATE OF CORRECTION

PATENT NO. : 6,821,675 B1
DATED : November 23, 2004
INVENTOR(S) : Morigaki et al.

It is certified that error appears in the above-identified patent and that said Letters Patent is hereby corrected as shown below:

Column 30,
Line 42, "claim 14 or claim 15" should read -- claim 16 or claim 17 --

Signed and Sealed this

Twenty-sixth Day of April, 2005

JON W. DUDAS
*Director of the United States Patent and Trademark Office*